US012568994B2

(12) United States Patent
Garcia Guerrero

(10) Patent No.: US 12,568,994 B2
(45) Date of Patent: Mar. 10, 2026

(54) METHOD FOR OBTAINING NATURAL COLOURING DERIVED FROM SAFFRON AND PRODUCT THUS OBTAINED

(71) Applicant: SAFRANTE GLOBAL COMPANY SLU, Alhaurin de la Torre-Malaga (ES)

(72) Inventor: Gustavo Garcia Guerrero, Alhaurin de la Torre (ES)

(73) Assignee: SAFRANTE GLOBAL COMPANY SLU, Alhaurin de la Torre-Malaga (ES)

( * ) Notice: Subject to any disclaimer, the term of this patent is extended or adjusted under 35 U.S.C. 154(b) by 464 days.

(21) Appl. No.: 17/767,313

(22) PCT Filed: Sep. 30, 2020

(86) PCT No.: PCT/ES2020/070589

§ 371 (c)(1),
(2) Date: Apr. 7, 2022

(87) PCT Pub. No.: WO2021/069776

PCT Pub. Date: Apr. 15, 2021

(65) Prior Publication Data

US 2022/0386659 A1 Dec. 8, 2022

(30) Foreign Application Priority Data

Oct. 8, 2019 (ES) ................................ ES201930874

(51) Int. Cl.
A23L 5/43 (2016.01)
A21D 13/80 (2017.01)
(Continued)

(52) U.S. Cl.
CPC ................ *A23L 5/43* (2016.08); *A21D 13/80* (2017.01); *A23L 2/58* (2013.01); *A23L 7/109* (2016.08); *A23L 7/198* (2016.08); *A23L 23/00* (2016.08)

(58) Field of Classification Search
CPC ... A23L 2/58; A23L 5/43; A23L 7/109; A23L 7/198; A23L 23/00; A23V 2002/00
See application file for complete search history.

(56) References Cited

U.S. PATENT DOCUMENTS 6,458,399 B1 * 10/2002 Garcia Fernandez .. A23L 27/11
426/429

FOREIGN PATENT DOCUMENTS

ES 2149132 A1 10/2000
ES 2345186 9/2010
(Continued)

OTHER PUBLICATIONS

Spinach Tiger. "Making Homemade Saffron Pasta." 2009. Downloaded Oct. 21, 2025 from https://spinachtiger.com/making-homemade-saffron-pasta/.*

(Continued)

*Primary Examiner* — Nikki H. Dees
(74) *Attorney, Agent, or Firm* — Brown & Michaels, PC

(57) ABSTRACT

The invention relates to a method for obtaining food colouring derived from saffron, which is based on: the use of saffron threads that are ground and mixed with a base of corn flour, wheat flour, maltodextrin or similar, in a process in which, during mixing, an alcoholic liquid is added to promote the transfer of the colour; and subsequent drying with warm air to produce a product with units of saffron colour and aroma that vary according to the proportions of saffron and base used.

2 Claims, 1 Drawing Sheet

(51) Int. Cl.
| | |
|---|---|
| *A23L 2/58* | (2006.01) |
| *A23L 7/10* | (2016.01) |
| *A23L 7/109* | (2016.01) |
| *A23L 23/00* | (2016.01) |

(56) References Cited

FOREIGN PATENT DOCUMENTS

| | | | |
|---|---|---|---|
| ES | 2599638 A1 | | 2/2017 |
| GB | 190523063 A | * | 11/1906 |
| GB | 191001623 A | | 1/1911 |

OTHER PUBLICATIONS

International Search Report for PCT/ES2020/070589 dated Dec. 23, 2020.

* cited by examiner

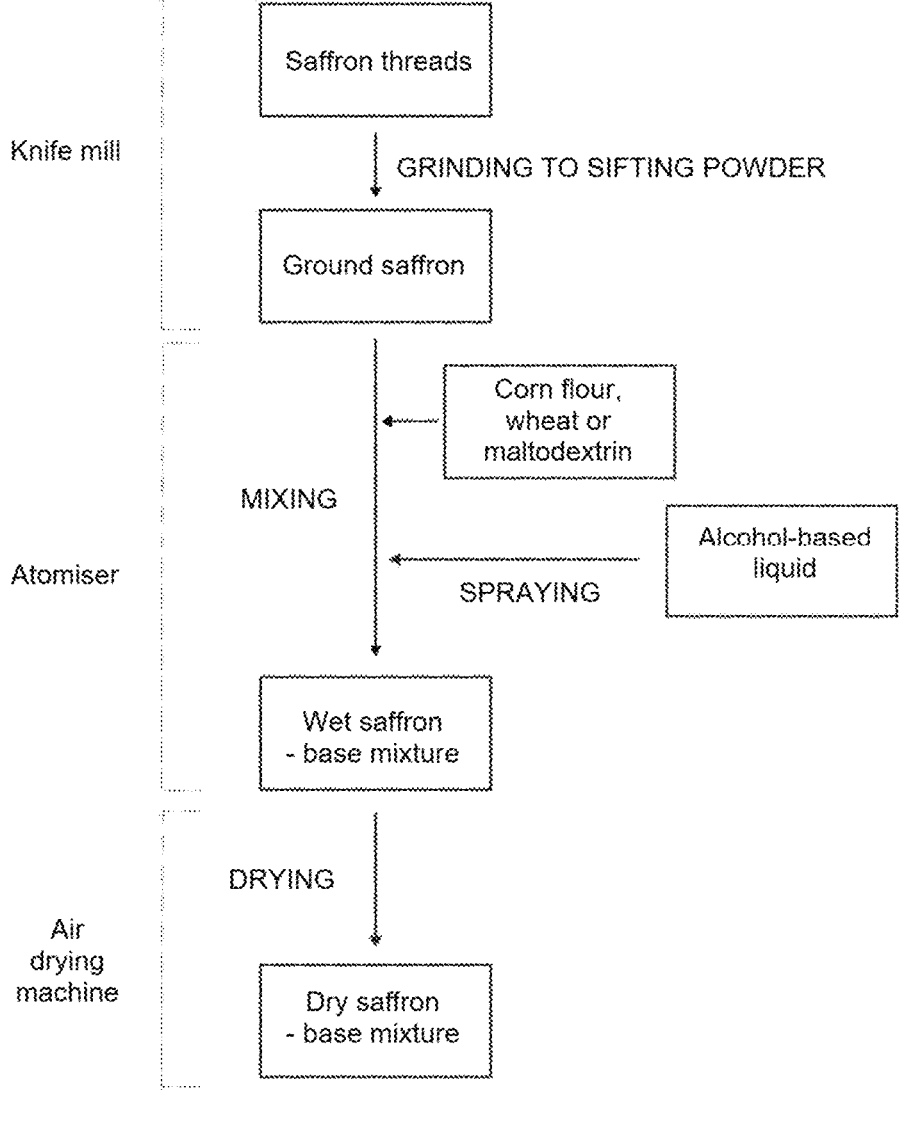

METHOD FOR OBTAINING NATURAL COLOURING DERIVED FROM SAFFRON AND PRODUCT THUS OBTAINED

OBJECT OF THE INVENTION

The object of the present invention patent is to present a new method for obtaining a natural colouring derived from saffron and the product thus obtained.

The method identifies all the steps to be followed and the ingredients to be used to obtain a new product for colouring and seasoning foods, essentially made up of saffron and corn flour, wheat flour, maltodextrin or any other base required by the client.

This method of obtaining is based on use of saffron threads that are ground and mixed with corn flour in a process in which an alcohol-based liquid is added to promote the transfer of the colour and drying with warm air.

The obtained product consists of a powder having a saffron colour, flavour and aroma.

It is especially applicable to the food sector and gourmet products given the cost of the ingredients used.

BACKGROUND OF THE INVENTION

The current trend in food colouring has increasingly focused on naturally occurring pigments because of consumer preferences. Crocin, the digentiobioside of crocetin, and other crocetin glycosides, namely crocetin gentiobioside glucoside, crocetin diglucoside and others, are probably the only true water-soluble natural carotenoid pigments and are the constituent of saffron, the world's most expensive spice.

Up until now, different methods known for obtaining saffron extracts and flavour concentrates are reported in the current state of the art.

For example, patents ES2345186T3 and ES2149132 exist which relate to methods for obtaining saffron concentrate or saffron extract and focus on obtaining saffron colouring.

More specifically, patent ES2345186T3 relates to an efficient method for the extraction of high stability, superior quality, value added, standardised, ready-to-use saffron pigments and flavour concentrates, the method of which comprises the steps of mixing saffron with one food-grade solvent or a combination of more food grade-solvents, macerating and stirring the mixture with continued protection against light, centrifuging the macerated mixture to separate undesirable fibrous plant material, cooling the centrifuge immediately, lyophilising the cooled centrifuge under reduced pressure to obtain crude material, isolating the concentrate by column chromatography, and obtaining saffron pigments and flavour concentrates that shine in a bright orange colour, with a recovery of approximately 95%.

Likewise, the method of patent ES2149132 consists of subjecting the stigmas of the saffron flower to the operative phases of dehydration, trituration by grinding, triple stirring and heating with a mixture of de-ionised water/96° alcohol, filtering the resultant micelles and concentration under vacuum and low temperature conditions in order to obtain a liquid extract with solids comprised between 2% and 3%; from said liquid extract a solid or powdery extract is obtained through dehydration by lyophilisation, sublimation under 0° C., pouring and heating at a temperature lower than 38° and resting.

In neither of the two foregoing cases is the saffron mixed with a base of corn flour, wheat flour, maltodextrin or some other base, nor is the resulting product a dry powder that allows it to be better preserved, dosed and handled in industrial processes.

The products resulting from the indicated patents are saffron extracts or concentrates that hinder the dosing thereof in industrial processes, making it very difficult to achieve uniform colouring and aromas and leading to an increase in costs.

DESCRIPTION OF THE INVENTION

To ease or, where appropriate, eliminate all the aforementioned problems, this new method for obtaining a new saffron-based colouring and the product thus obtained, object of the present invention patent, is presented.

The method of the present patent is as follows:

1/ The starting raw material are saffron threads.

2/ The saffron will be ground with a knife mill so that it is ground to a sifting powder.

3/ The ground saffron will be put in the formula according to the quantity to which its potential for action on the product to be prepared is to be reduced; for example, if there is a saffron that, once analysed, is known to have 200 units of colour and a client needs a product to give colour to soups and a product with 20 units of colour, the saffron will be lowered from 200 units to the 20 units required, putting 10% of saffron and 90% of the chosen base; when the mixture is made, a product that is exactly like the one needed by the client will be obtained at a much lower cost and it will facilitate the mixing thereof, since it is a product for direct consumption without complications. In the case of saffron, most companies do not know how to handle saffron and end up complicating the formulas and in most cases increasing their costs; under normal circumstances, indications are usually given to factories to help them know what product they have to use. This is an indicative table:

from 10 to 20 units for soups and beverages from 30 to 50 units for cakes and pastries from 60 to 100 units for ready-made meals from 100 to 150 units for paellas, risottos and noodles 4/ The ground saffron product can be mixed with corn flour, wheat flour, maltodextrin or any other base required by the client.

5/ The mixture of the ground saffron product and the chosen base are mixed as follows:

The quantity of saffron according to the chosen final product will be placed in the atomiser and then the quantity of chosen base according to the chosen final product and chosen base according to the requirements of the order will be placed; once the two raw materials have been added to the atomiser, it will then be mixed, (the atomiser will operate at about 3,000 revolutions per minute); the two raw materials will be mixed from approximately 40 seconds to 3 minutes depending on the chosen base, and in this mixing process the saffron particles will be broken and transferred to the base giving it colour; however, for a total and homogeneous transfer to take place, a liquid must be added to these materials which moistens the components and helps to transfer the colour of the saffron particles to the particles of the chosen base.

6/ This liquid is a compound of 95% feed alcohol and 5% soft water.

7/ The liquid must be introduced little by little and by spraying into the atomiser while it is operating, such that the moisture plus the breakage of the particle promotes the homogenisation of the colour of the product.

8/ Once the time in the atomiser has ended, the product will have a homogeneous colour and be in a moist state.

9/ It is removed from the atomiser machine and taken to a warm aft drying machine, since any other type of heat would burn or toast it and said product would be unusable; the machine used blows a stream of warm air at 40 degrees and the drying time thereof is approximately 25 minutes (which will also depend on how industrial the machines are).

10/ Once the product is dry, it is collected in a container and weighed to check that its weight is correct; once weighed, it is taken to the packing machine according to the packing required by the client.

11/ Once packed, it is taken for the final labelling and packaging thereof as requested.

This product is not only sold as food, but it is also used in cosmetics, both alone and with a mixture of other colours, for perfumes, for natural dyes, either for beauty or for organic clothing dyes, or for dyes for school supplies to be used by young children, since they are natural and can be put in their mouths and even eaten.

DESCRIPTION OF THE DRAWINGS

As a complement to the present description, and for the purpose of helping to make the features of the invention more readily understandable, the present specification is accompanied by a FIGURE, constituting an integral part of the same, which represents the flow chart of the method for obtaining.

PREFERRED EMBODIMENT OF THE INVENTION

As can be seen in the attached FIGURE, the method for obtaining saffron-based colouring is made up of several well-differentiated steps:

Grinding the saffron with a knife mill, starting with saffron threads until they are ground to a sifting powder.

Mixing the ground saffron with the corn flour, wheat flour, maltodextrin or the base chosen by the client in the atomiser as follows:

introducing the quantities of ground saffron and the chosen base into the atomiser, mixing both components with the atomiser at +/−3000 rpm for 40 seconds to 3 minutes depending on the chosen base, slowly adding alcohol-based liquid by spraying during the mixing process so that the colour of the saffron particles is completely transferred to the particles of the base of flour, maltodextrin or the chosen base. The alcohol-based liquid is a compound of 95% feed alcohol and 5% soft water.

The liquid is introduced little by little and by spraying into the atomiser while the atomiser is operating, such that the moisture plus the breakage of the particle promotes the homogenisation of the colour of the product.

Extracting the resulting mixture from the atomiser.

Drying the resulting mixture by introducing it into a warm air drying machine and keeping it there for a period of 20 to 30 minutes, subjecting the mixture to a jet of warm air at a temperature between 35° C. and 45° C. A warm air drying machine is used since any other type of heat would burn or toast the resulting mixture and that product would be unusable, Weighing, packing and labelling the resulting product The natural colouring derived from saffron obtained by the aforementioned method consists of a mixture of saffron with corn flour, wheat flour, maltodextrin or similar depending on its intended use and in proportions of saffron and corn flour, wheat flour, maltodextrin or similar that will depend on the units of colour that the obtained colouring is intended to have.

Thus, in the natural colouring derived from saffron obtained, the number of units of colour resulting from the final product is as follows, depending on its intended use:

from 10 to 20 units for soups and beverages from 30 to 50 units for cakes and pastries from 60 to 100 units for ready-made meals from 100 to 150 units for paellas, risottos and noodles Having sufficiently described the nature of the present invention, in addition to examples of implementation, it must be added that the process and ingredients of said invention may be modified, provided that it does not imply altering the features claimed below.

The invention claimed is:

1. A method for obtaining natural colouring derived from saffron comprising:

grinding saffron threads using a knife mill, such that the saffron threads are ground to a sifting powder to produce ground saffron;

mixing the ground saffron with a base of corn flour, wheat flour, or maltodextrin in an atomizer to form a mixture comprising:

introducing quantities of the ground saffron and the base into the atomizer;

mixing the quantities of the ground saffron and the base within the atomiser at +/−3000 rpm for 40 seconds to 3 minutes;

spraying an alcohol-based liquid into the atomizer while the quantities of the ground saffron and the base are being mixed;

extracting the mixture from the atomizer;

drying the mixture by: placing the mixture into a warm air drying machine for a period of 20 to 30 minutes, subjecting the mixture to a jet of warm air at a temperature between 35° C. and 45° C.;

weighing, packing and labelling the mixture.

2. The method for obtaining natural colouring derived from saffron according to claim 1, wherein the alcohol-based liquid sprayed during mixing of the base of corn flour, wheat flour or maltodextrin and the ground saffron is a compound of 95% feed alcohol and 5% soft water.

* * * * *